United States Patent
Pieper et al.

(10) Patent No.: US 8,802,912 B2
(45) Date of Patent: Aug. 12, 2014

(54) EFFECT OF WET REDUCTION ON CATALYST STABILITY AND METHODS OF MAINTAINING CATALYST STABILITY

(75) Inventors: Jeffery Pieper, Des Plaines, IL (US); Wei Pan, Mount Prospect, IL (US); Dean Rende, Arlington Heights, IL (US); Gary Malott, Bloomingdale, IL (US)

(73) Assignee: UOP LLC, Des Plaines, IL (US)

( * ) Notice: Subject to any disclaimer, the term of this patent is extended or adjusted under 35 U.S.C. 154(b) by 886 days.

(21) Appl. No.: 12/489,609

(22) Filed: Jun. 23, 2009

(65) Prior Publication Data

US 2010/0323880 A1    Dec. 23, 2010

(51) Int. Cl.
*C07C 5/333*    (2006.01)

(52) U.S. Cl.
USPC ........... 585/659; 585/654; 585/660; 585/661; 585/906; 502/20; 502/34; 502/53; 502/514

(58) Field of Classification Search
USPC ................. 585/500, 654, 659, 660, 661, 906; 502/20, 34, 53, 514
See application file for complete search history.

(56) References Cited

U.S. PATENT DOCUMENTS

| | | | |
|---|---|---|---|
| 2,943,044 A * | 6/1960 | Hindin | 208/146 |
| 3,898,173 A * | 8/1975 | Hayes | 502/37 |
| 3,978,150 A * | 8/1976 | McWilliams, Jr. | 585/659 |
| 4,430,517 A * | 2/1984 | Imai et al. | 585/660 |
| 4,615,792 A * | 10/1986 | Greenwood | 208/134 |
| 4,869,808 A * | 9/1989 | Vora et al. | 208/138 |
| 5,334,793 A | 8/1994 | Kocal | |
| 5,376,607 A | 12/1994 | Sechrist | |
| 5,726,112 A | 3/1998 | Fung et al. | |
| 5,733,518 A | 3/1998 | Durante et al. | |
| 5,755,956 A | 5/1998 | Galperin et al. | |
| 6,123,833 A * | 9/2000 | Sechrist et al. | 208/134 |
| 6,143,166 A | 11/2000 | Nacamuli | |
| 6,177,381 B1 | 1/2001 | Jensen et al. | |
| 6,280,608 B1 | 8/2001 | Jensen et al. | |

(Continued)

FOREIGN PATENT DOCUMENTS

EP    0149698 A1    7/1985

OTHER PUBLICATIONS

Hiller, et al., "Gas Production" in Ullmann's Encyclopedia of Industrial Chemistry, 2006, Wiley-VCH, available on-line Dec. 15, 2006.*

(Continued)

*Primary Examiner* — In Suk Bullock
*Assistant Examiner* — Bradley Etherton
(74) *Attorney, Agent, or Firm* — Arthur E Gooding (57) ABSTRACT

The present invention provides a method of increasing stability of a catalyst used in a dehydrogenation process. The method includes storing fresh catalyst in a reduction zone, passing a gas through the reduction zone, introducing hydrocarbons and hydrogen gas into a reactor positioned downstream from the reduction zone to facilitate a dehydrogenation reaction, and replenishing spent catalyst in the reactor with fresh catalyst from the reduction zone. The gas has a moisture content at or below about 4000 ppmv and a temperature at or below about 290° C. The reactor includes catalyst for increasing the rate of the dehydrogenation reaction. The moisture content of the gas may be reduced to at or below about 4000 ppmv by passing the gas through a drier or by using an inert gas stream. The temperature of the gas may also be reduced.

4 Claims, 4 Drawing Sheets

(56) References Cited

U.S. PATENT DOCUMENTS

| | | |
|---|---|---|
| 6,290,916 B1 | 9/2001 | Sechrist et al. |
| 6,358,400 B1 | 3/2002 | Bogdan et al. |
| 6,486,370 B1 | 11/2002 | Rende et al. |
| 6,576,803 B2 | 6/2003 | Cantrell et al. |
| 6,632,765 B1 * | 10/2003 | Chen .............................. 502/53 |
| 6,756,515 B2 | 6/2004 | Rende et al. |
| 6,884,400 B1 * | 4/2005 | Austin et al. .................. 422/216 |
| 7,008,914 B2 | 3/2006 | Smith et al. |
| 2003/0105373 A1 * | 6/2003 | Rende et al. .................. 585/444 |

OTHER PUBLICATIONS

Haber, et al. ("Manual of Methods and Procedures for Catalyst Characterization" in Pure & Appl. Chem., vol. 67, Nos. 8/9, (1985)), pp. 1257-1259 and 1269-1270—month unknown.*

Vora, B.V.; Imai, T.; Pujado, P.R.; Spinner, J.B. *Latest LAB Developments;* http://www.ostigov/energycitations/product.biblio.jsp?osti id+5952915; Nov. 1, 1984. Abstract only.

Vora, B.V.; Imai, T.; Pujado, P.R.; Spinner, J.B.; UOP Inc; *Petrechemical Developments/Latest LAB ((Linear Alkylbenzene)) Developments;* Hydrocarbon Process Int. Ed. V36N.11; Nov. 1984; Abstract only.

*HP Innovations/Innovative reactor raises LAB [(linear alkylbenzene) synthesis reactor] conversion;* Hydrocarbon Processing; V76 N.4; Gulf Publishing Co.; Apr. 1997, Abstract only.

Bhasin, M.M, McCain, J.H., Vora, B.V., Imai, T., and Pujado, P.R.; *Dehydrogenation and oxydehydrogenation of paraffins to olefins;* Applied Catalysis A: General; vol. 221, Issues 1-2; Nov. 2001; Abstract only.

* cited by examiner

EFFECT OF WET REDUCTION ON CATALYST STABILITY AND METHODS OF MAINTAINING CATALYST STABILITY

FIELD OF THE INVENTION

The present invention relates to the field of hydrocarbon dehydrogenation processes. In particular, the present invention relates to systems and methods for increasing the stability of catalysts used in hydrocarbon dehydrogenation processes.

DESCRIPTION OF RELATED ART

Platinum-based catalysts are used for numerous hydrocarbon conversion processes. One such hydrocarbon conversion process is the dehydrogenation of hydrocarbons, such as the conversion of long chain paraffins to olefins. The olefins can be further converted to produce components such as linear alkyl benzene (LAB), which can then be sulfonated to produce linear alkylbenzene sulfonate (LAS). Both LAB and LAS are commonly used raw materials in the manufacture of biodegradable detergents.

Catalyst development is directed by improvements in three areas: catalyst activity, catalyst selectivity and catalyst stability.

SUMMARY OF THE INVENTION

The present invention provides a method of increasing stability of a catalyst used in a hydrocarbon dehydrogenation process. The method includes storing fresh catalyst in a reduction zone, passing a gas through the reduction zone, introducing hydrocarbons and hydrogen gas into a reactor positioned downstream from the reduction zone to facilitate a dehydrogenation reaction, and replenishing spent catalyst in the reactor with fresh catalyst from the reduction zone. The gas has a moisture content at or below about 4000 ppmv. The reactor includes catalyst for increasing the rate of the dehydrogenation reaction. The moisture content of the gas may be reduced to at or below about 4000 ppmv by passing the gas through a drier or by using an inert gas stream.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

Figure 1A:
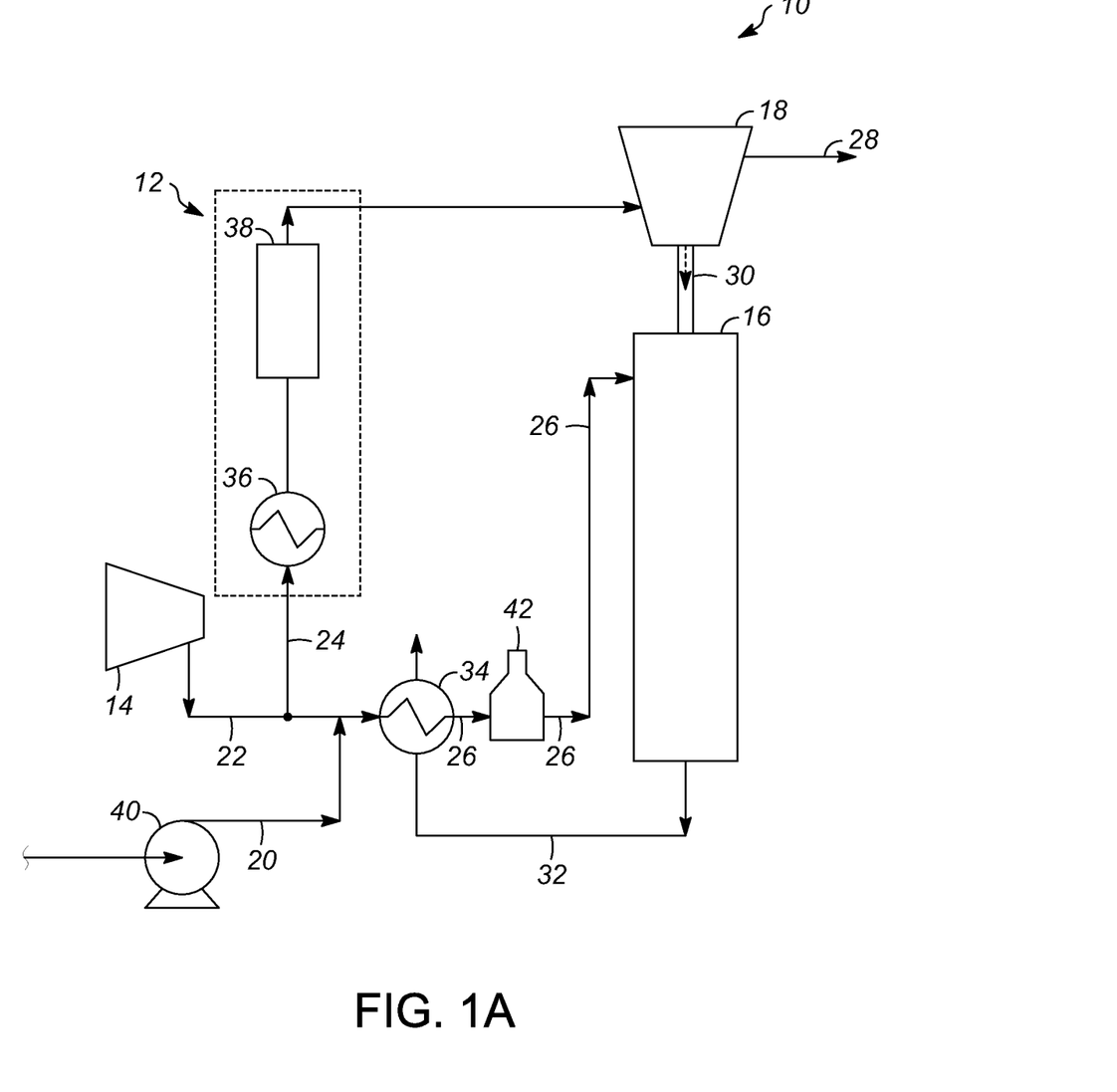
FIG. 1A is a schematic view of a first embodiment of a hydrocarbon dehydrogenation system.

FIG. 1A shows a schematic view of a first embodiment of a hydrocarbon dehydrogenation system reactor section 10 with an integrated catalyst stability system 12. The catalyst stability system 12 functions to increase the life of catalysts used in the hydrocarbon dehydrogenation system reactor section 10 by increasing the stability of catalysts housed remotely from or integrated above the reaction zone, or from the location in which the dehydrogenation reaction takes place. By either maintaining or increasing the stability of the catalyst while being stored, the lifetime of the catalyst also increases. Although the catalyst stability system 12 is discussed as being used in conjunction with a hydrocarbon dehydrogenation process, the catalyst stability system 12 may be used in conjunction with any industrial process where it is desired to increase the life of catalyst housed separately from or integrated above the reaction zone.

The hydrocarbon dehydrogenation system reactor section 10 includes the catalyst stability system 12, a recycle gas compressor 14, a reactor (which may be a reaction zone of a single stacked reactor) 16, a reduction zone (of a single stacked reactor) or hopper 18, a hydrocarbon line 20, a hydrogen recycle gas line 22, a hydrogen reduction gas line 24, a combined feed line 26, a reduction gas vent line 28, a catalyst transfer line 30, a reactor effluent line 32, a combined feed line heat exchanger 34, a combined feed line pump 40 and a combined feed line charge heater 42. In one embodiment, the reactor 16 is a reaction zone of a single stacked reactor and the reduction zone 18 is a separate zone of the single stacked reactor. Generally, the hydrocarbon line 20 and the hydrogen recycle gas line 22 transport hydrocarbons and hydrogen gas, respectively, to the combined feed line 26. The combined feed line 26 introduces the mixture of hydrocarbons and hydrogen gas into the reactor 16. In the reactor 16, the mixture of hydrocarbons and hydrogen gas flows over a catalyst bed, where the actual hydrocarbon dehydrogenation reaction takes place. The hydrogen reduction gas line 24 introduces hydrogen gas into the reduction zone 18, which is positioned upstream from the reactor 16 and houses fresh catalyst. The fresh catalyst is kept in close proximity to the reactor 16 so that once the catalyst in the reactor 16 is spent or deactivated, the fresh catalyst in the reduction zone 18 can replenish the catalyst in the reactor 16 through the catalyst transfer lines 30. When the reduction zone is integrated above the reactor, the fresh catalyst also serves as a catalyst seal to prevent by-passing of the hydrocarbons and hydrogen gas around the catalyst bed.

Hydrocarbons are fed into the hydrocarbon dehydrogenation system reactor section 10 from the combined feed line pump 40 through the hydrocarbon line 20, which transports the hydrocarbons to the combined feed line 26. Hydrogen gas produced in the dehydrogenation process is recycled back into the hydrocarbon dehydrogenation system reactor section 10 using a recycle gas compressor 14 and is compressed through the hydrogen recycle gas line 22 and into the combined feed line 26, where it is combined with the hydrocarbons from the hydrocarbon line 20. Prior to combining with the hydrocarbon line 20, the flow rate of the hydrogen gas in the hydrogen recycle gas line 22 can be adjusted such that it combines with the hydrocarbon in the combined feed line 26 at a predetermined ratio. The ratio will depend on the reaction taking place in the reactor 16. For a hydrocarbon dehydrogenation reaction, the hydrogen to hydrocarbon mole ratio is between about 0.1:1 and about 40:1, and particularly between about 3:1 and about 10:1. The flow rate of the hydrogen gas may be adjusted by any means known in the art. In one embodiment, the flow rate of the hydrogen gas into the combined feed line 26 is adjusted by changing the motor speed of a screw type recycle gas compressor 14. The hydrogen gas used in the hydrocarbon dehydrogenation system reactor section 10 may be wet recycled hydrogen separated from the effluent produced in the reactor 16. Although the hydrocarbon dehydrogenation system reactor section 10 is discussed as using hydrogen gas, other materials may be used, such as steam, methane, ethane, carbon dioxide, nitrogen, argon or mixtures thereof.

After the hydrocarbons and the hydrogen gas have combined in the combined feed line 26, the mixture is sent through the combined feed line heat exchanger 34 and combined feed line charge heater 42 before being introduced into the reactor 16. The combined feed line charge heater 42 heats the hydrocarbons and hydrogen gas to a temperature substantially similar to the temperature in the reactor 16. In one embodiment, the combined stream of hydrocarbon and hydrogen gas is heated to a temperature of between about 400° C. and about 600° C.

In the reactor 16, the hydrocarbons and hydrogen gas are passed over a catalyst bed, which decreases the amount of energy required for the hydrocarbon dehydrogenation reaction to occur. In one embodiment, the catalyst is a layered catalyst composition having an inner core and an outer layer. The inner core is composed of a material which has a substantially lower adsorptive capacity for catalytic metal precursors relative to the outer layer. Examples of the inner core material include, but are not limited to: refractory inorganic oxides, silicon carbide and metals. The outer layer is bonded to the inner core and is composed of an outer refractory inorganic oxide. The outer layer has uniformly dispersed thereon a platinum group metal, a promoter metal and a modifier metal. The platinum group metals include platinum, palladium, rhodium, iridium, ruthenium and osium. Examples of promoter metals include, but are not limited to: tin, germanium, rhenium, gallium, bismuth, lead, indium, cerium, zinc and mixtures thereof. Modifier metals include, but are not limited to: alkali metals, alkaline earth metals and mixtures thereof. Examples of alkali and alkaline earth metals include, but are not limited to: lithium, sodium, potassium, cesium, rubidium, beryllium, magnesium, calcium, strontium and barium. In a particular embodiment, the catalyst is a platinum/tin-based catalyst. Additional information about the catalyst can be found, for example, in U.S. Pat. Nos. 6,177,381 and 6,280,608, which are herein incorporated by reference.

Hydrocarbon dehydrogenation conditions include a temperature of from about 400° C. to about 600° C., a pressure of from about 1 to about 1013 kPa and a liquid hourly space velocity (LHSV) of from about 0.1 to about 100 $hr^{-1}$. As used herein, the abbreviation "LHSV" means liquid hourly space velocity, which is defined as the volumetric standard flow rate of liquid per hour divided by catalyst volume, where the liquid volume and the catalyst volume are in the same volumetric units. Generally, for normal paraffins, the lower the molecular weight, the higher the temperature required for comparable conversion. The pressure in the dehydrogenation zone in the reactor 16 is maintained as low as practicable to avoid side unselective reactions such as hydrocarbon cracking.

After the hydrocarbon dehydrogenation reaction has taken place, the effluent flows from the reactor 16 through the reactor effluent line 32. The effluent from the reactor 16 generally contains unconverted dehydrogenatable hydrocarbons, hydrogen and products of the hydrocarbon dehydrogenation reaction. The effluent is typically cooled and passed to a hydrogen separation zone which typically includes a separator or contact condenser located downstream of the hydrocarbon dehydrogenation system reactor section 10 to separate the hydrogen-rich vapor phase from the hydrocarbon-rich liquid phase. Generally, the hydrocarbon-rich liquid phase is further separated by means of either a suitable selective adsorbent for the recovery of olefins or a selective reaction or reactions with the desired reaction product recovered by means of a suitable fractionation scheme. Unconverted dehydrogenatable hydrocarbons are recovered and may be recycled to the reactor 16. Products of the hydrocarbon dehydrogenation reaction are recovered as final products or as intermediate products in the preparation of other compounds.

The hydrogen reduction gas line 24 branches off from the hydrogen recycle gas line 22 and transports hydrogen gas to the reduction zone 18. The reduction zone 18 is positioned upstream of the reactor 16 and houses fresh catalyst until the catalyst is needed in the reactor 16. Hydrogen gas is passed through the reduction zone 18 so that the catalyst being housed in the reduction zone 18 is not stored under stagnant conditions. By passing hydrogen gas through the reduction zone 18, the catalyst is exposed to flowing gas and remains in reduced form.

The hydrogen gas flowing through the hydrocarbon dehydrogenation system reactor section 10 will usually include some amount of water. One example for a source of water into the hydrocarbon dehydrogenation system reactor section 10 includes injecting water into the combined feed line 26. In one embodiment, the hydrogen gas has a moisture content of up to about 6000 parts per million in gas volume (ppmv) water. As shown and described in further detail below in the Examples section, when hydrogen gas having a moisture content of about 6000 ppmv contacts the catalyst for an extended period of time, the stability of the catalyst decreases. The stability of the catalyst decreases when the hydrogen gas passes through the reduction zone 18 and contacts the catalyst because wet reduction of the catalyst takes place as a result of exposure to the water in the hydrogen gas, slowly changing or deactivating the catalyst over time. Therefore, when the catalyst is housed in the reduction zone 18 for extended periods of time, the catalyst can begin to change or deactivate before it is even used. The change or deactivation of the catalyst in the reduction zone 18 is unexpected because the temperature in the reduction zone 18 is typically much lower than the temperature in the reactor 16 or the temperature at which the catalyst is typically pre-reduced in the manufacturing process. In a hydrocarbon dehydrogenation process, hydrogen gas is typically passed through the reduction zone 18 at about 20 pounds per square inch (psi) at a temperature of between about 270° C. and about 310° C. Because catalysts used in the hydrocarbon dehydrogenation system reactor section 10 are typically reduced at about 500° C., it is unexpected that the catalyst would experience any change at such a low temperature and low amount of moisture.

To prevent or decrease the amount of wet reduction taking place in the reduction zone 18, the hydrocarbon dehydrogenation system reactor section 10 includes the catalyst stability system 12. The catalyst stability system 12 functions to control the moisture content and temperature of the hydrogen gas entering the reduction zone 18. It is believed that wet reduction of the catalyst is related to the moisture content and the temperature of the hydrogen gas and that the moisture content and the temperature of the hydrogen gas are inter-related. Thus, a decrease in one of the parameters may allow for an increase in the other parameter without causing wet reduction of the catalyst to take place. By maintaining the moisture content and temperature of the hydrogen gas at predetermined levels, catalyst deactivation may be prevented or at least minimized.

The catalyst stability system 12 generally includes a hydrogen gas heat exchanger 36 and a drier 38 positioned upstream of the reduction zone 18. The hydrogen gas in the hydrogen reduction gas line 24 is sent through the hydrogen gas heat exchanger 36 to heat the hydrogen gas. In one embodiment, the hydrogen gas in the hydrogen reduction gas line 24 is heated to a temperature of between about 100° C. and about 290° C. The drier 38 is positioned at the hydrogen reduction gas line 24 downstream from the hydrogen gas heat exchanger 36 and reduces the amount of moisture in the hydrogen gas before it enters the reduction zone 18.

In one embodiment, the hydrogen gas is heated to a temperature of between about 180° C. and about 250° C. and more particularly between about 200° C. and about 220° C. After the hydrogen gas passes through the drier 38, the hydrogen gas has a moisture content of less than about 6000 parts per million (ppmv). Particularly, the hydrogen gas has a moisture content of between about 3000 ppmv and about 6000 ppmv and more particularly between about 3500 ppmv and about 4500 ppmv. Thus, by the time the hydrogen gas in the hydrogen reduction gas line 24 enters the reduction zone 18, the hydrogen gas has a moisture content of less than about 6000 ppmv and a temperature of less than about 250° C. When the hydrogen gas entering the reduction zone 18 has a moisture content of about 4000 ppmv and a temperature of about 200° C., the catalyst housed in the reduction zone 18 has a total stability of about 157.5 hours.

In another embodiment, the hydrogen gas is heated to a temperature of between about 250° C. and about 350° C. and more particularly between about 270° C. and about 310° C. After the hydrogen gas passes through the drier 38, the hydrogen gas has a moisture content of less than about 650 parts per million (ppmv). Particularly, the hydrogen gas has a moisture content of less than about 100 ppmv and more particularly less than about 10 ppmv. Thus, by the time the hydrogen gas in the hydrogen reduction gas line 24 enters the reduction zone 18, the hydrogen gas has a moisture content of less than about 650 ppmv and a temperature of above about 250° C. When the hydrogen gas entering the reduction zone 18 has a moisture content of about 620 ppmv and a temperature of about 290° C., the catalyst housed in the reduction zone 18 has a total stability of about 155 hours.

In another embodiment, the hydrogen gas is heated to a temperature of between about 180° C. and about 250° C. and more particularly between about 180° C. and about 220° C. After the hydrogen gas passes through the drier 38, the hydrogen gas has a moisture content of less than about 650 parts per million by volume (ppmv). Particularly, the hydrogen gas has a moisture content of less than about 100 ppmv and more particularly less than about 10 ppmv. Thus, by the time the hydrogen gas in the hydrogen reduction gas line 24 enters the reduction zone 18, the hydrogen gas has a moisture content of less than about 650 ppmv and a temperature of less than about 250° C. When the hydrogen gas entering the reduction zone 18 has a moisture content of about 620 ppmv and a temperature of about 200° C., the catalyst housed in the reduction zone 18 has a total stability of about 112 hours.

Figure 1B:
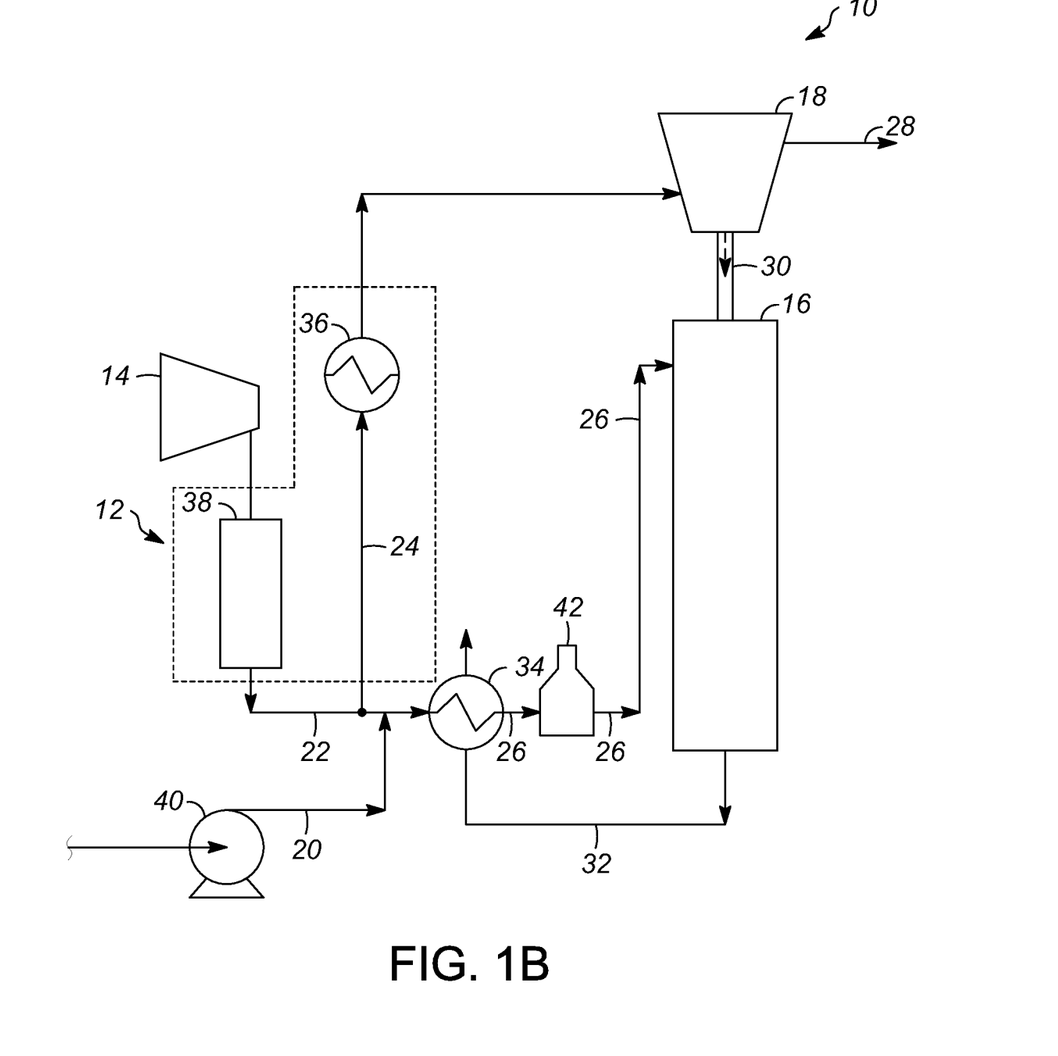
FIG. 1B is a schematic view of a second embodiment of the hydrocarbon dehydrogenation system.

Although FIG. 1A depicts the drier 38 as being positioned on the hydrogen reduction gas line 24 downstream of the hydrogen gas heat exchanger 36 and upstream of the reduction zone 18, the drier 38 may be positioned anywhere upstream of the reduction zone 18. For example, as shown in FIG. 1B, the drier 38 may also be positioned at the hydrogen recycle gas line 22 to dry all of the hydrogen gas entering the hydrocarbon dehydrogenation system reactor section 10. Although FIGS. 1A and 1B depict using a drier 38 to lower the moisture content of the hydrogen gas entering the hydrocarbon dehydrogenation system reactor section 10, the catalyst stability system 12 may include any piece(s) of equipment that will reduce the amount of moisture in the hydrogen gas before entering the reduction zone 18 without departing from the intended scope of the present invention.

When fresh catalyst is needed in the reactor 16, catalyst flows from the reduction zone 18 through the catalyst transfer line 30 to the reactor 16. When catalyst flows to the reactor 16, some amount of hydrogen gas also flows to the reactor 16. In one embodiment where the reduction zone 18 is integrated above the reactor 16 with no isolation in the catalyst transfer line 30, between about 2% and about 10% hydrogen gas constantly flows from the reduction zone 18 through the catalyst transfer line 30 to the reactor 16 to prevent hydrocarbons and hydrogen from the reactor 16 entering into the reduction zone 18. The remainder of the hydrogen gas in the reduction zone 18 is purged through the reduction gas vent line 28 to avoid stagnant conditions in the reduction zone 18.

Figure 2:
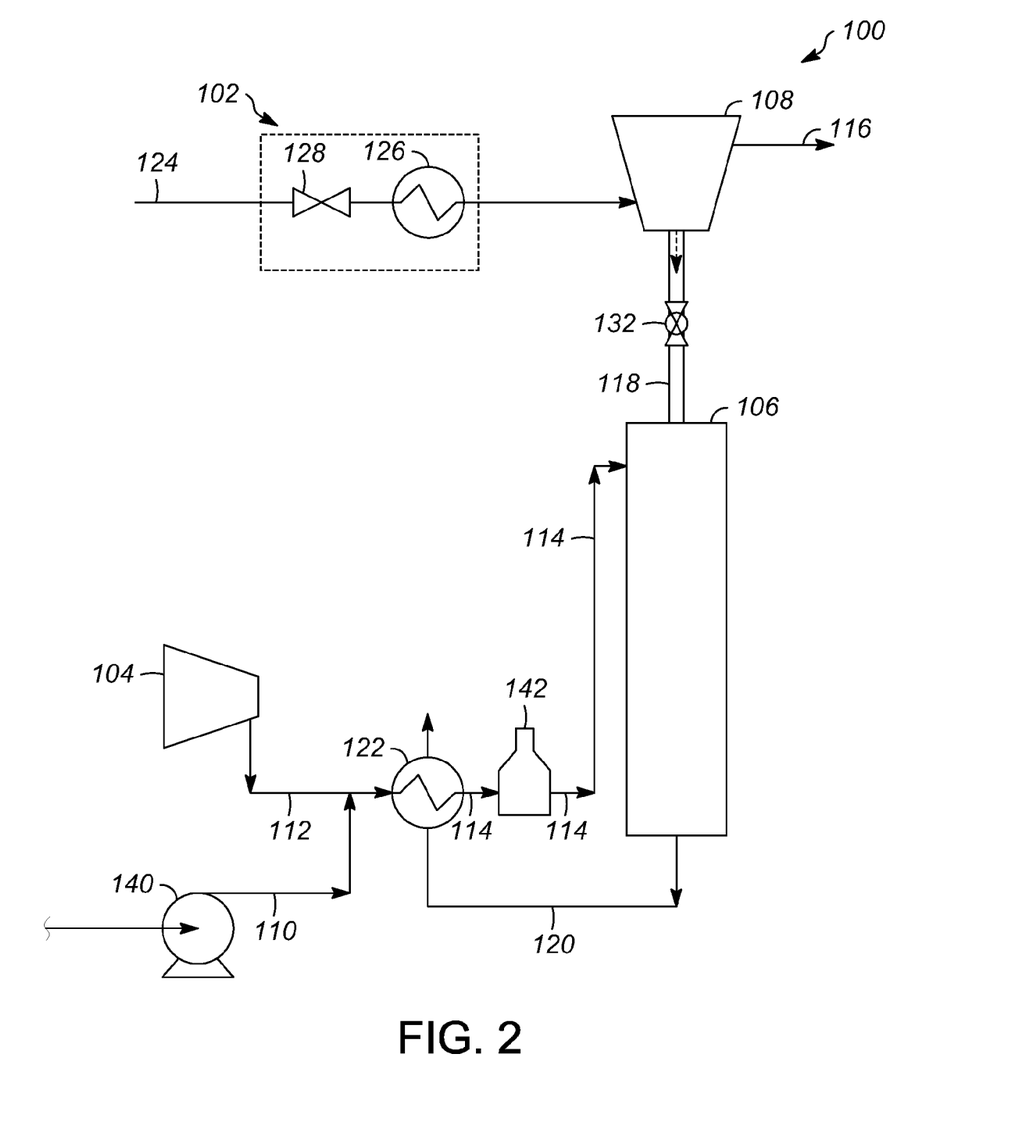
FIG. 2 is a schematic view of a third embodiment of the hydrocarbon dehydrogenation system.

FIG. 2 shows a schematic view of a third embodiment of a hydrocarbon dehydrogenation system reactor section 100. The hydrocarbon dehydrogenation system reactor section 100 includes a catalyst stability system 102, a recycle gas compressor 104, a reactor 106, a reduction zone or hopper 108, a hydrocarbon line 110, a hydrogen recycle gas line 112, a combined feed line 114, a reduction gas vent line 116, a catalyst transfer line 118, a reactor effluent line 120, a combined feed line heat exchanger 122, a combined feed line pump 140 and combined feed line charge heater 142. The recycle gas compressor 104, reactor 106, reduction zone 108, hydrocarbon line 110, hydrogen recycle gas line 112, combined feed line 114, reduction gas vent line 116, catalyst transfer line 118, reactor effluent line 120, combined feed line exchanger 122 and combined feed line charge heater 142 of the hydrocarbon dehydrogenation system reactor section 100 are connected and function similarly to the recycle gas compressor 14, reactor 16, reduction zone 18, hydrocarbon line 20, hydrogen recycle gas line 22, combined feed line 26, reduction gas vent line 28, catalyst transfer line 30, reactor effluent line 32, combined feed line exchanger 34 and combined feed line charge heater 42 of the hydrocarbon dehydrogenation system reactor section 10 illustrated in FIG. 1A. The hydrocarbon dehydrogenation system reactor section 100 differs from the hydrocarbon dehydrogenation system reactor section 10 primarily because of the catalyst stability system reactor section 102 of the hydrocarbon dehydrogenation system reactor section 100.

The catalyst stability system 102 includes a dry hydrogen gas line 124, a dry hydrogen heat exchanger 126, an inlet flow control valve 128 and a catalyst transfer line isolation valve 132 (catalyst transfer line isolation valve 132 is part of the catalyst stability system 102 even though shown outside the dotted lines). The dry hydrogen heat exchanger 126 functions similarly to the hydrogen gas heat exchanger 36 of the catalyst stability system 12 (FIGS. 1A and 1B) to heat the dry hydrogen gas in the dry hydrogen gas line 124. In one embodiment, the hydrogen gas is heated to a temperature of less than about 350° C. The inlet flow control valve 128 is connected on the dry hydrogen gas line 124 upstream of the reduction zone 108 and controls the flow rate of dry hydrogen gas entering the catalyst stability system 102. The dry hydrogen is provided from an outside source and is used to keep the catalyst in the reduction zone 108 dry and also for proof reduction of the catalyst. The dry hydrogen gas contains substantially no water and is introduced into the reduction zone 108 to ensure that the catalyst in the reduction zone 108 is heated above about 200° C. and more particularly between 270° C. and 300° C. prior to transferring catalyst to the reactor 106 to prevent thermal shock to the internals of the reactor 106 and for proof reduction of the catalyst. In addition to maintaining a flow through the reduction zone 108, the dry hydrogen gas also maintains the moisture content of the reduction zone 108 at a predetermined level. In one embodiment, the dry hydrogen gas has a moisture content of less than about 6000 ppmv. An example of a dry hydrogen source is a pressure swing adsorption (PSA) hydrogen unit. The majority of the hydrogen gas injected into the hydrocarbon dehydrogenation system reactor section 100 should pass through the reduction zone 108 and can be combined with the hydrogen produced from the hydrocarbon dehydrogenation reaction into the hydrogen supply system.

The dry hydrogen gas flowing through the reduction zone 108 is purged from the reduction zone 108 at the reduction gas vent line 116 to avoid stagnant conditions. The catalyst transfer line isolation valve 132 is connected in the catalyst transfer line 118 between the outlet of the reduction zone 108 and the inlet of the reactor 106. The catalyst transfer line isolation valve 132 controls the flow of catalyst from the reduction zone 108 to the reactor 106 and is switchable between an open position and a closed position. Generally, the catalyst transfer line isolation valve 132 is in the closed position and maintains the catalyst in the reduction zone 108. When catalyst is needed in the reactor 106, the catalyst transfer line isolation valve 132 opens and fresh catalyst is allowed to flow from the reduction zone 108 to the reactor 106 through the catalyst transfer line 118. In one embodiment, the catalyst transfer line isolation valve 132 is a double block and bleed valve that provides positive isolation between the reduction zone 108 and the reactor 106 to prevent catalyst, air or hydrogen gas from unintentionally entering the reactor.

Figure 3:
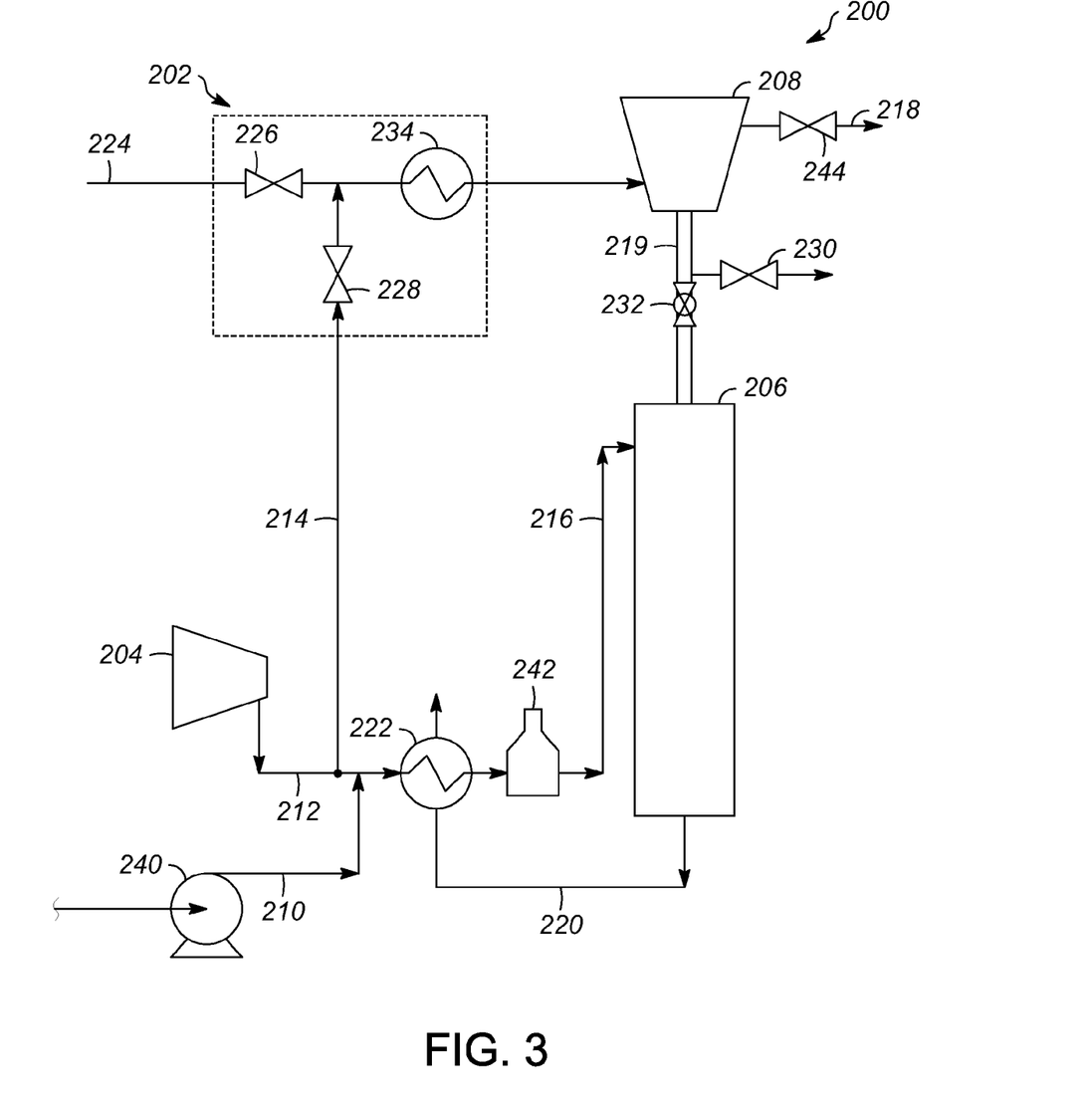
FIG. 3 is a schematic view of a third embodiment of the hydrocarbon dehydrogenation system.

FIG. 3 shows a schematic view of a fourth embodiment of a hydrocarbon dehydrogenation system reactor section 200. The hydrocarbon dehydrogenation system reactor section 200 includes a catalyst stability system 202, recycle gas compressor 204, a reactor 206, a reduction zone or hopper 208, a hydrocarbon line 210, a hydrogen recycle gas line 212, a hydrogen reduction gas line 214, a combined feed line 216, a reduction gas vent line 218, a catalyst transfer line 219, a reactor effluent line 220, a combined feed line heat exchanger 222, a combined feed pump 240 and a combined feed line charge heater 242. The recycle gas compressor 204, reactor 206, reduction zone 208, hydrocarbon line 210, hydrogen recycle gas line 212, hydrogen reduction gas line 214, combined feed line 216, reduction gas vent line 218, catalyst transfer line 219, reactor effluent line 220, combined feed line heat exchanger 222, combined feed pump 240 and combined feed line charge heater 242 of the hydrocarbon dehydrogenation system reactor section 200 are connected and function similarly to the recycle gas compressor 14, reactor 16, reduction zone 18, hydrocarbon line 20, hydrogen recycle gas line 22, hydrogen reduction gas line 24, combined feed line 26, reduction gas vent line 28, catalyst transfer line 30, reactor effluent line 32, combined feed line heat exchanger 34, combined feed pump 40 and combined feed line charge heater 42 of the hydrocarbon dehydrogenation system reactor section 10 illustrated in FIG. 1A. The hydrocarbon dehydrogenation system reactor section 200 differs from the hydrocarbon dehydrogenation system reactor section 10 primarily because of the catalyst stability system 202 of the hydrocarbon dehydrogenation system reactor section 200.

The catalyst stability system 202 includes an inert gas line 224, an inert gas inlet valve 226, a hydrogen gas inlet valve 228, an inert gas outlet isolation valve 230, a catalyst transfer line isolation valve 232, an inert gas heat exchanger 234 and a reduction gas vent line isolation valve 244 (inert gas outlet isolation valve 230, catalyst transfer line isolation valve 232 and reduction gas vent line isolation valve 244 are part of the catalyst stability system 202 even though shown outside the dotted lines). The inert gas heat exchanger 234 functions similarly to the gas heat exchanger 34 of the catalyst stability system 12 (FIGS. 1A and 1B) to heat the inert gas in the inert gas line 224. In one embodiment, the inert gas is heated to a temperature of less than about 350° C. The inert gas inlet valve 226 is connected on the inert gas line 224 upstream of the reduction zone 208 and controls the flow rate of inert gas entering the catalyst stability system 202. The inert gas outlet isolation valve 230, the reduction gas vent line isolation valve 244 and catalyst transfer line isolation valve 232 are switchable between open and closed position. In one embodiment, both the inert gas outlet isolation valve 230 and reduction gas vent line isolation valve 244 are configured as double block and bleed systems to prevent hydrogen from mixing with the inert gas system and inert gas from mixing with the hydrogen supply system. Generally, the catalyst transfer line isolation valve 232 will be closed unless transferring fresh catalyst from the reduction zone 208 into the reactor 206. While purging the reduction zone 208 with inert gas, the inert gas outlet isolation valve 230 is open and the reduction gas vent line isolation valve 244 is closed to prevent any inert gas from leaving through the reduction gas vent line 218. The inert gas contains substantially no water and is introduced into the reduction zone 208 to ensure that the catalyst in the reduction zone 208 does not become stagnant. In addition to maintaining a flow through the reduction zone 208, the inert gas also maintains the moisture content of the reduction zone 208 at a predetermined level. In one embodiment, the inert gas has a moisture content of less than about 6000 ppmv. The inert gas may be any gas that does not react with the catalyst housed in the reduction zone 208. In one embodiment, the inert gas is nitrogen.

In the hydrocarbon dehydrogenation system reactor section 200, the hydrogen reduction gas line 214 is re-routed to feed the hydrogen gas into the inert gas line 224 downstream of the inert gas inlet valve 226 and upstream of the inert gas heat exchanger 234. The hydrogen gas inlet valve 228 and inert gas inlet valve 226 are switchable between open and closed positions. In one embodiment, both the hydrogen gas inlet valve 228 and inert gas inlet valve 226 are configured as double block and bleed systems to prevent hydrogen from mixing with the inert gas system and inert gas from mixing with the hydrogen supply system. The hydrogen gas inlet valve 228 controls the amount of hydrogen gas that enters the inert gas line 224. In one embodiment, the volume of nitrogen in the reduction zone 208 is considered negligible and is allowed to be purged into the hydrogen supply system. When switching to hydrogen gas flow, the inert gas outlet isolation valve 230 will close and the reduction gas vent line isolation valve 244 will open allowing both the retention volume of nitrogen in the reduction zone 208 and the hydrogen gas to leave through the reduction gas vent line 218. The inert gas inlet valve 226 will be closed. The hydrogen gas functions to proof-reduce the catalyst and to purge the reduction zone 208 and the catalyst transfer line 219 for a short period of time to remove any inert gas before allowing catalyst to flow from the reduction zone 208 to the reactor 206. Thus, even if the hydrogen gas stream is wet, the moisture will have a minimal effect on the catalyst. Before entering the catalyst transfer lines 219, the hydrogen gas flowing through the hydrogen reduction gas line 214 is heated in the inert gas heat exchanger 234.

When catalyst is needed in the reactor 206, the flow of hydrogen gas is maintained and the catalyst transfer line isolation valve 232 opens and controls the rate of catalyst flowing from the reduction zone 208 and into the reactor 206. When the catalyst transfer isolation valve 232 is in the open position, fresh catalyst is allowed to flow from the reduction zone 208 to the reactor 206 through the catalyst transfer line 219. In one embodiment, the catalyst transfer isolation valve 232 is a double block and bleed valve that prevents catalyst or inert gas from unintentionally entering the reactor 206.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Catalyst Pre-Treatment

Two catalysts typically used in hydrocarbon dehydrogenation processes, DeH-15 and DeH-11, both available form UOP, Des Plaines, Ill., were tested to determine their stability and methyl cyclohexane (MCH) conversion ability at varying conditions. About 430 cubic centimeters (cc) of the catalyst was loaded into an isoterm zone of a stainless steel reactor. The space above and below the catalyst bed was packed with inert spacer. The treatment gas mixture contained about 160.84 L/h of hydrogen gas and about 620 parts per million by volume (ppmv) $H_2O$. The moisture level was obtained by injecting about 0.1 cc/h of water into the hydrogen gas line using an ISCO pump. An injection of water was introduced at the start of ramp. The reactor temperature was raised to the target temperature (either 200° C. or 290° C.) at a ramp rate of about 1.5° C./min. Once the reactor reached the target temperature, the reactor was kept at the target temperature for about 116 hours while maintaining the gas mixture composition and flow rate. After about 116 hours, water injection was cut off and the reactor was cooled down with hydrogen gas to room temperature. Nitrogen gas was used to briefly purge the reactor before unloading.

DeH-15 was used as the catalyst in Examples 1, 2, 3, 4 and 5 and Comparative Examples A, B and C. DeH-11 was used as the catalyst in Examples 6, 7, 8, 9 and 10 Comparative Examples D and E. The catalysts were either tested fresh (Comparative Examples A, C and D) or after being pre-treated (Examples 1-10 and Comparative Examples B and E) with a gas stream.

The catalysts used in Examples 1 and 2 were pre-treated with a gas stream having properties designed to simulate reduction zone conditions for a hydrocarbon dehydrogenation process of the present invention.

The DeH-15 catalyst used in Comparative Examples A and C were fresh and was not subject to any pre-treatment. The DeH-15 catalyst used in Comparative Example B was pre-treated with a gas stream having properties designed to simulate reduction zone conditions for a conventional hydrocarbon dehydrogenation process.

Similarly, the DeH-11 catalyst used in Comparative Example D was fresh and was not subject to any pre-treatment while the DeH-11 catalyst used in Comparative Example E was pre-treated with a gas stream having properties designed to simulate reduction zone conditions for a conventional hydrocarbon dehydrogenation process.

Table 1 lists the parameters of the gas used to pre-treat the catalysts of each of Examples 1-10 and Comparative Examples A-E.

|  | Catalyst | Condition | Gas | Temp. (° C.) | Water Content (ppmv) | Duration (h) | Gas Outlet Pressure (psi) |
|---|---|---|---|---|---|---|---|
| Example 1 | DeH-15 | Pre-treated | $H_2$ | 290 | 620 | 116 | 20 |
| Example 2 | DeH-15 | Pre-treated | $H_2$ | 200 | 4000 | 116 | 20 |
| Example 3 | DeH-15 | Pre-treated | $H_2$ | 200 | 620 | 116 | 20 |
| Comp. Example A | DeH-15 | Fresh | None | None | None | None | None |
| Comp. Example B | DeH-15 | Pre-treated | $H_2$ | 290 | 4000 | 116 | 20 |
| Example 4 | DeH-15 | Pre-treated | $N_2$ | 200 | 4000 | 116 | 20 |
| Example 5 | DeH-15 | Pre-treated | $N_2$ | 200 | 620 | 116 | 20 |
| Comp. Example C | DeH-15 | Fresh | None | None | None | None | None |
| Example 6 | DeH-11 | Pre-treated | $H_2$ | 290 | 620 | 116 | 20 |
| Example 7 | DeH-11 | Pre-treated | $H_2$ | 200 | 4000 | 116 | 20 |
| Example 8 | DeH-11 | Pre-treated | $H_2$ | 200 | 620 | 116 | 20 |
| Comp. Example D | DeH-11 | Fresh | None | None | None | None | None |
| Comp. Example E | DeH-11 | Pre-treated | $H_2$ | 290 | 4000 | 116 | 20 |
| Example 9 | DeH-11 | Pre-treated | $N_2$ | 200 | 4000 | 116 | 20 |
| Example 10 | DeH-11 | Pre-treated | $N_2$ | 200 | 620 | 116 | 20 |

Stability Test

To determine catalyst stability, various catalysts were tested in a laboratory scale plant. The catalysts were placed in a reactor and the temperature of the reactor was raised to about 479.4° C. (895° F.) in hydrogen gas before a hydrocarbon feed was introduced. A hydrocarbon feed composed of about between about 12 wt % and about 13 wt % of n-$C_{10}$, between about 28 wt % and about 29 wt % of n-$C_{11}$, between about 29 wt % and about 30 wt % of n-$C_{12}$, between about 27 wt % and about 28 wt % of n-$C_{13}$, up to about 1 wt % of n-$C_{14}$ and between about 1 wt % and about 1.5 wt % of non-normals was allowed to flow over the catalyst under an outlet pressure of about 20 pounds per square inch (psig) at a hydrogen gas stream and hydrocarbon stream ratio of about 4:1. The liquid hourly space velocity (LHSV) was at about 28 $hr^{-1}$. Hydrogen gas and hydrocarbon feed were combined upstream of the reactor to form a combined feed which was vaporized prior to entering the reactor. The total normal olefin concentration in the product (% TNO) was maintained at about 16.9±1 wt % during the stability test by adjusting the reactor inlet temperature.

The product was analyzed hourly by online gas chromatography to quantify the normal olefin yield. At the start of the run (SOR), no water was injected. The concentration of water in the combined feed was less than about 10 wt-ppm based on the weight of the combined feed. As the catalyst started to deactivate, the temperature was increased to maintain the same TNO of about 16.9. Once the reactor temperature at 3 inches above the catalyst bed reached about 493.3° C. (920° F.), the catalyst was regarded as deactivated and the run was stopped. This tested the dry mode stability of the catalyst.

To test the water management mode stability of the catalysts, an extra step was added after the reactor temperature reached about 493.3° C. in the dry phase. About 2000 ppmv of water was then injected into the reactor to combine with the hydrogen gas and hydrocarbon feed and vaporized prior to entering the reactor. The reactor temperature was also decreased to about 479.4° F. to maintain the TNO at about 16.9. The end of run (EOR) was determined as when the reactor temperature reached about 493.3° C. again. The time between the SOR and EOR was used to compare catalyst stability. When the reactor temperature reached about 493.3° C., the feed and water injection were stopped and the reactor was cooled down under the flow of hydrogen gas.

Table 2 shows the stability of the catalysts treated in Examples 1-10 and Comparative Examples A-E. The stability of the catalysts were measured by the number of hours the catalyst remained active. Once the reactor temperature reached about 493.3° C. to achieve a TNO of about 16.9, the catalyst was no longer considered to have enough activity to be used effectively.

TABLE 2

| | Stability in Dry phase (h) | Total Stability in WM (h) |
|---|---|---|
| Example 1 | 88 | 155 |
| Example 2 | 93 | 157.5 |
| Example 3 | 60 | 112 |
| Comp. Example A | 95 | 164 |
| Comp. Example B | 48 | 100 |
| Example 4 | 81 | 148 |
| Example 5 | 71 | 135 |
| Comp. Example C | 93 | 158 |
| Example 6 | 87 | 120 |
| Example 7 | 90 | 122 |
| Example 8 | 83 | 116 |
| Comp. Example D | 98 | 145 |
| Comp. Example E | 72 | 112 |
| Example 9 | 70 | 112 |
| Example 10 | 88 | 115 |

As illustrated in Table 2, the fresh catalysts used in Comparative Examples A, C and D were stable for the longest amounts of time. By contrast, at conditions simulating a reduction zone in a conventional hydrocarbon dehydrogenation process (Comparative Examples B and E), the stability of the catalyst decreased substantially. In particular, the dry mode life of the DeH-15 catalyst pre-treated with hydrogen gas (Comparative Example B) decreased by almost 50% from about 95 hours to about 48 hours while the life of the DeH-11 catalyst (Comparative Example E) pre-treated with hydrogen gas decreased by about 26.7%, from about 98 hours to about 72 hours. Similar results were shown in the water management mode, with the life of the DeH-15 catalyst decreasing by about 39% and the life of the DeH-11 catalyst decreasing by about 22.8%. Because the stability of the DeH-11 catalyst decreased to a lesser extent than the DeH-15 catalyst, Comparative Examples A and B and Comparative Examples D and E illustrate that the DeH-11 catalyst is affected by the temperature and moisture content of the gas stream to a lesser degree than the DeH-15 catalyst.

When only the moisture content of the gas stream was decreased to about 620 ppm and the temperature remained at about 290° C. (Examples 1 and 6), the life of the catalysts decreased only slightly compared to the life of fresh catalyst. In particular, the dry mode life of the DeH-15 catalyst pre-treated with hydrogen gas (Example 1) decreased by only about 7.37% and the dry mode life of DeH-11 catalyst pre-treated with hydrogen gas (Example 6) decreased by only about 11.2%. Similar results were shown in the water management mode, with the life of the DeH-15 catalyst decreasing by only about 5.49% and the life of the DeH-11 catalyst decreasing by only about 17.24%. Examples 1 and 6 illustrate that lowering only the moisture content of the gas stream will increase the lifetime of the DeH-15 and DeH-11 catalysts compared to the lifetime of DeH-15 and DeH-11 catalysts exposed to conventional dehydrogenation process conditions.

When only the temperature of the gas stream was decreased to about 200° C. and the moisture content remained at 4000 ppm (Examples 2, 4, 7 and 9), the life of the catalysts decreased only slightly compared to the life of fresh catalyst. In particular, the dry mode life of the DeH-15 catalyst pre-treated with hydrogen gas (Example 2) decreased by only about 2%, the dry mode life of DeH-15 catalyst pre-treated with nitrogen gas (Example 4) decreased by only about 13%, the dry mode life of DeH-11 catalyst pre-treated with hydrogen gas (Example 7) decreased by only about 8% and the dry mode life of DeH-11 catalyst pre-treated with nitrogen gas (Example 9) decreased by only about 2.78%. Similar results were shown in the water management mode. Examples 2, 4, 7 and 9 illustrate that lowering only the temperature of the gas stream will increase the lifetime of the DeH-15 and DeH-11 catalysts compared to the lifetime of DeH-15 and DeH-11 catalysts exposed to conventional dehydrogenation process conditions.

Table 2 also illustrates that when the temperature and the moisture content of the gas stream were both decreased from the conditions of a conventional hydrocarbon dehydrogenation process, the life of the catalyst may still decrease, but to a lesser extent. In particular, when the hydrogen gas stream had a $H_2O$ content of about 620 ppmv and a temperature of about 200° C. (Example 3), the dry mode life of the DeH-15 catalyst only decreased about 37%, compared to the 50% decrease exhibited when the hydrogen gas stream had a $H_2O$ content of about 4000 ppmv and a temperature of about 290° C. (Comparative Example B). Thus, when a catalyst is housed in a reduction zone for an extended period of time while being exposed to a gas having a relatively high moisture content and at higher temperatures, the catalyst becomes unstable, decreasing the stability of the catalyst. As can also be seen from Table 2, this trend holds regardless of the gas used to pre-treat the catalyst. The stability of the catalyst when either hydrogen gas or nitrogen gas was used decreased relative to the stability of fresh catalyst, but increased relative to the stability of catalyst exposed to a higher moisture content and temperature.

In particular, the catalyst used in Example 5, which was DeH-15 catalyst pre-treated with nitrogen gas at 200° C. and a water content of about 620 ppm, had a stability of about 71 hours in the dry mode and about 135 hours in the water management mode. The catalyst used in Example 3, which also was DeH-15, was exposed to hydrogen gas under the same conditions and had a dry phase stability of about 60 hours and a water management mode stability of about 112 hours.

Methyl Cyclohexane (MCH) Dehydrogenation Test

To determine the properties of catalysts after being exposed to moisture, the ability of the catalysts to dehydrogenate methyl cyclohexane to toluene was tested. The MCH test is a probe reaction used to gauge the metal function (e.g., dehydrogenation ability) of the catalyst. After pretreatment, about 1 cc of catalyst was loaded into the MCH dehydrogenation testing reactor and about 1.0 grams of 40-60 mesh sand was also added to fill void spaces between the catalyst. A purge stream of hydrogen gas bypassed the MCH saturator and was used to pre-reduce the catalyst before MCH testing. The hydrogen gas flow rate was about 250 cc/min while the reactor was held at about 200° C. for about half an hour with about a 6.67° C./min ramp rate and was held at about 565° C. for about three hours.

The reactor was then allowed to cool down to about 300° C. at a ramp rate of about 2.0° C./min and held at about 300° C. Hydrogen gas then bypassed the reactor but still passed through the MCH saturator. The MCH saturator was kept at about 0° C. After hydrogen gas flowed through the MCH saturator for about 15 minutes, a mixture of hydrogen gas and MCH was introduced into the reactor. Once the temperature reached about 300° C. for about 20 minutes, online gas chromatography was used to analyze the reaction products.

The same procedure was applied when the reactor temperature was raised from about 300° C. to about 325° C., from about 325° C. to about 350° C., from 350° C. to about 375° C., from about 375° C. to about 400° C., from about 400° C. to about 450° C. and from about 450° C. to about 500° C., respectively, with a ramp rate of about 2.0° C./min. The reactor was then cooled down to about room temperature by hydrogen gas (bypassing the MCH saturator). The percent conversion from MCH to toluene at each of the temperatures was measured.

Table 3 shows the MCH conversion of the catalysts used in Examples 1-10 and Comparative Examples A-E. The amount of MCH conversion is correlated to the activity of the catalyst.

TABLE 3

| | MCH Conversion (%) | | | | | |
|---|---|---|---|---|---|---|
| | 325° C. | 350° C. | 375° C. | 400° C. | 450° C. | 500° C. |
| Example 1 | 0.38 | 1.07 | 1.83 | 3.26 | 8.95 | 20.06 |
| Example 2 | 0.38 | 0.52 | 1.06 | 2.01 | 5.74 | 14.09 |
| Example 3 | 0.32 | 0.67 | 1.73 | 3.15 | 8.71 | 20.36 |
| Comp. Example A | 0.33 | 0.89 | 2.27 | 3.91 | 11.4 | 25.97 |
| Comp. Example B | 0 | 0 | 0.37 | 1.91 | 5.43 | 14.26 |
| Example 4 | 0.23 | 0.57 | 1.18 | 2.04 | 6.16 | 14.77 |
| Example 5 | 0.21 | 0.59 | 1.34 | 2.60 | 7.64 | 18.19 |
| Comp. Example C | 0.39 | 0.89 | 1.88 | 3.48 | 9.89 | 22.81 |
| Example 6 | 0.47 | 0.73 | 1.23 | 2.15 | 5.98 | 15.44 |
| Example 7 | 0.19 | 0.48 | 0.96 | 1.60 | 4.50 | 12.10 |
| Example 8 | 0.15 | 0.60 | 1.15 | 2.26 | 7.35 | 19.5 |
| Comp. Example D | 0.21 | 0.62 | 1.44 | 2.85 | 9.00 | 23.85 |
| Comp. Example E | 0 | 0 | 0.41 | 2.19 | 7.16 | 22.7 |
| Example 9 | 0.34 | 0.52 | 1.00 | 1.78 | 5.46 | 14.52 |
| Example 10 | 0.18 | 0.49 | 1.15 | 2.09 | 6.45 | 16.98 |

As can be seen in Table 3, the ability of fresh DeH-15 and DeH-11 catalyst (Comparative Examples A, C and D) to convert MCH to toluene increased as the temperature of the reactor increased. The ability of pre-treated catalyst to convert MCH to toluene also increased as the temperature of the reactor increased. In particular, at about 400° C., the fresh DeH-15 catalyst of Comparative Example A resulted in almost 4% MCH conversion. By comparison, when the DeH-15 catalyst was exposed to about 4000 ppmv $H_2O$ at about 290° C. (Comparative Example B), the MCH conversion was about 1.91%, a decrease of about 51.2% compared to fresh DeH-15 catalyst. When the DeH-15 catalyst was only exposed to about 620 ppmv $H_2O$ at about 200° C. (Example 3), the MCH conversion decreased by only about 19.4% compared to fresh DeH-15 catalyst, converting about 3.15% of the MCH to toluene. Similar trends were found when either the temperature or the moisture content was varied. When hydrogen gas was used, the amount of MCH converted to toluene was generally between the amount of MCH converted when the catalyst was not exposed to any pre-treatment and the amount of MCH converted when the catalyst was exposed to conventional dehydrogenation process conditions. However, when nitrogen gas was used, the amount of MCH converted to toluene decreased by up to about 25% when compared to the amount of MCH converted when the catalyst was exposed to fresh catalyst.

The results in Table 3 indicate that the DeH-11 catalyst was more resilient than the DeH-15 catalyst to moisture content and temperature. While fresh DeH-11 catalyst converted about 2.85% of the MCH to toluene (Comparative Example D), DeH-11 catalyst exposed to about 4000 ppmv $H_2O$ at about 290° C. (Comparative Example E) converted about 2.19% of the MCH to toluene at about 400° C., a decrease of less than about 23.1%. Similarly, when the DeH-11 catalyst was pretreated with about 620 ppmv $H_2O$ at about 200° C. (Example 8), the MCH conversion decreased by only about 20.7%. Similar trends were found when either the temperature or the moisture content was varied. The amount of MCH converted to toluene was either between the amount of MCH converted when the catalyst was not exposed to any pre-treatment and the amount of MCH converted when the catalyst was exposed to conventional dehydrogenation process conditions or was substantially similar to the amount of MCH converted when the catalyst was exposed to conventional dehydrogenation process conditions.

The invention has been described with reference to various specific and preferred embodiments and techniques. However, it should be understood that many variations and modifications may be made while remaining within the spirit and scope of the invention.

The invention claimed is:

1. A method of increasing stability of a catalyst used in a dehydrogenation process, the method comprising:
    storing fresh catalyst in a storage hopper for an average catalyst residence time between 100 and 200 hours;
    passing a gas through the storage hopper, wherein the gas has a moisture content ranging from about 600 ppmv to about 4000 ppmv and where the gas is maintained at a temperature between 200° C. and about 290° C., and wherein the gas is a non-oxidizing gas selected from the list consisting of hydrogen, methane, ethane, carbon dioxide, nitrogen, argon and mixtures thereof;
    introducing hydrocarbons and hydrogen gas into a reactor positioned downstream from the storage hopper to facilitate a dehydrogenation reaction, wherein the reactor includes catalyst for increasing the rate of the dehydrogenation reaction; and
    replenishing spent catalyst in the reactor with fresh catalyst from the storage hopper.

2. The method of claim 1, wherein passing the gas through the storage hopper comprises passing a hydrogen gas stream through the storage hopper.

3. The method of claim 2, wherein maintaining the moisture content of the gas from about 600 ppmv to about 4000 ppmv comprises passing the gas through a drier positioned upstream of the storage hopper.

4. The method of claim 1, wherein maintaining the moisture content of the gas from about 600 ppmv to about 4000 ppmv comprises passing inert gas through the storage hopper.

\* \* \* \* \*